United States Patent [19]

Reid

[11] Patent Number: 4,813,695
[45] Date of Patent: Mar. 21, 1989

[54] MULTI-AXLE VEHICLE SUSPENSION

[75] Inventor: Roy C. Reid, Calgary, Canada

[73] Assignee: Altank Industries Ltd., Calgary, Alberta, Canada

[21] Appl. No.: 137,165

[22] Filed: Dec. 23, 1987

[51] Int. Cl.$^4$ .............................................. B62D 53/06
[52] U.S. Cl. ................... 280/104; 280/408; 280/680; 280/686; 180/24.02
[58] Field of Search ............. 180/22, 24.02; 280/408, 280/104, 680, 686, 786, 787, 790, 404, 405 B; 296/181, 183, 187

[56] References Cited

U.S. PATENT DOCUMENTS

| | | | |
|---|---|---|---|
| 2,415,533 | 2/1947 | Rainsford | 280/686 |
| 3,338,592 | 8/1967 | Hilderbrant et al. | 280/680 |
| 3,371,941 | 3/1968 | Preddy, Jr. | 280/680 |
| 4,111,451 | 9/1978 | Pinto | 280/408 |
| 4,223,904 | 9/1980 | McCall | 280/104 |
| 4,650,205 | 3/1987 | Jarlsson | 280/408 |

*Primary Examiner*—Richard A. Bertsch
*Attorney, Agent, or Firm*—Murray E. Thrift; Adrian D. Battison; Stanley G. Ade

[57] ABSTRACT

A multi-axle road vehicle has an equalizing resilient suspension for equalizing the load over the axles of a multi-axle set. The suspension is itself carried on a suspension subframe that is in turn mounted on the vehicle to pivot about a transverse, horizontal axis. The use of a pivoting subframe provides for equal axle loading over a much wider range of road conditions. The suspension system is especially suited for application to the "B" train multiple vehicle configuration, where the common suspension will be mounted on a subframe pivoted to the lead vehicle and carrying a fifth wheel for the following vehicle.

12 Claims, 4 Drawing Sheets

MULTI-AXLE VEHICLE SUSPENSION

FIELD OF THE PRESENT INVENTION

The present invention relates to a running gear suspension for a vehicle more particularly to a suspension for a vehicle having plural wheel carrying axles in a group.

BACKGROUND OF THE INVENTION

The descriptive terminology employed herein is that generally used and recognized by highway authorities throughout North America. A "highway" includes any type of load bearing surface, prepared or unprepared. A "vehicle" is any type of mobile transport equipment intended for operation on a highway. An "axle" includes, wheels, tires, brakes and such other equipment as required by applicable regulations. A "suspension" is the device by which the axles are attached, or mounted to the vehicle, or vehicle sub frame.

A "resilient suspension" is one intended to allow and provide for some predetermined degree of deflection between the vehicle and the highway, beyond that afforded by pneumatic tires alone.

An "equalizing resilient suspension" is one that by mechanical, pneumatic, hydraulic, or other interconnecting means, is intended to equalize loads between two or more adjacent axles, which might otherwise be unequally loaded to the point of overloading any individual axle—such unequal loading as would be induced by the vehicle passing over uneven terrain, or the vehicle assuming an attitude in the direction of travel other than parallel with the highway.

The essence of a resilient suspension is that vertical deflection of an axle caused by increasing loading, generates an increasing resistance to deflection in the suspension, proportional to the deflection, until the point is reached at which the axle has attained the design limit of travel, and it is then said to have "bottomed out".

The prime objective of an equalizing resilient suspension is to distribute unequal loading of any axle or axles to all axles in a group, and thus avoid premature "bottoming out" until all axles in the group have attained their proportional share of the group loading bottoming out force.

There are many types of resilient equalizing suspension commercially available on the North American market.

All such suspensions are designed on the basis that a straight line projected through the horizontal longitudinal centre line of the axles is parallel to the base structure of the suspension, and this geometry is a fixed condition in the attachment to the vehicle. It follows that when a travelling vehicle encounters terrain that alters the parallel fore & aft relationship between the "highway" bearing surface and the vehicle, the geometry of the suspension is altered accordingly.

The effect of the altered geometry is that the fore or aft axle of the group will "bottom out" at some group loading less than the design intention, as dictated by the degree of deviation from the design parallelism.

Another problem encountered in the prior art is the presence of cantilever bending stresses in the intermediate suspension of a "B" train multiple vehicle configuration. In the "B" train configuration, the suspension frame of a forward vehicle is extended rearwardly to allow the front of the following vehicle to be carried on the common suspension. The rearwardly extending structure, when rigidly attached to the forward vehicle, is cantilevered and is thus subject to significant cycling bending stresses. In addition, weight distribution considerations, and space limitations, invariably locate the king pin weight bearing point of the following vehicle behind the centre of reaction of the common suspension, and thus generate a cantilever moment downward on the common suspension and equally upwardly on the lead king pin in the proportion of the respective moment arms. This moment significantly increases the structural bending stresses.

The aim of this invention is to ameliorate the difficulties of the prior art.

SUMMARY

According to the present invention there is provided a vehicle having a suspension frame, plural, parallel wheel carrying axles, an equalizing resilient suspension mounting said axles on said suspension frame and frame mounting means mounting said suspension frame on said vehicle for pivoting movement about a substantially horizontal axis parallel to said wheel carrying axles.

Thus, the suspension frame is mechanically connected to the vehicle only by a pivot normal to the direction of travel. The suspension is then free to align the normal axle base line with the inclination of the "highway" at all times that the highway alignment and the vehicle longitudinal alignment deviate from an acceptable parallelism. The result is that the suspension is allowed to equalize to its original design capacity over a much wider range than can be achieved with a fixed connection at the vehicle.

In addition, the pivotal mounting of the suspension frame may be used in a "B" train multi-vehicle configuration to eliminate cantilever bending stresses. This results in a valuable weight saving and improved structural efficiency.

A further important benefit of the invention is an improvement in the roll-over stability of the vehicle. The invention extends the tolerance of attitude divergence over which equalized tire load bearing prevails, thus enhancing stability accordingly.

In preferred embodiments of the invention, an oscillation limiter is employed to limit the pivotal movement of the suspension frame with respect to the vehicle. This is desirably located relative to the pivot shaft such that a steering force component is applied to the suspension frame. This limits the steering induced forces on the pivot connections.

BRIEF DESCRIPTION OF THE DRAWINGS

In the accompanying drawings which illustrate prior art rigid suspensions and exemplary embodiments of the present invention.

DETAILED DESCRIPTION

Figure 1:
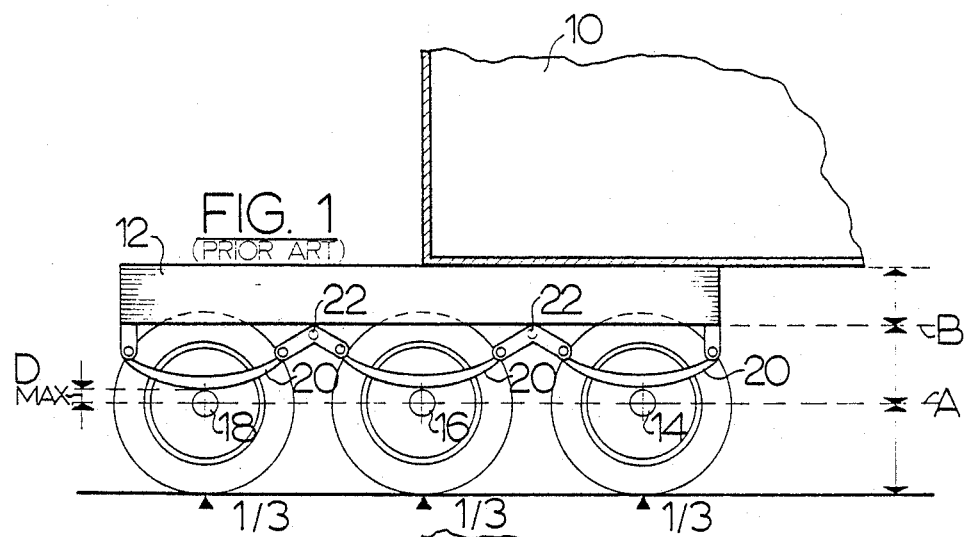
FIG. 1 is a schematic elevation of the prior art rigid suspension attachment.
Figure 2:
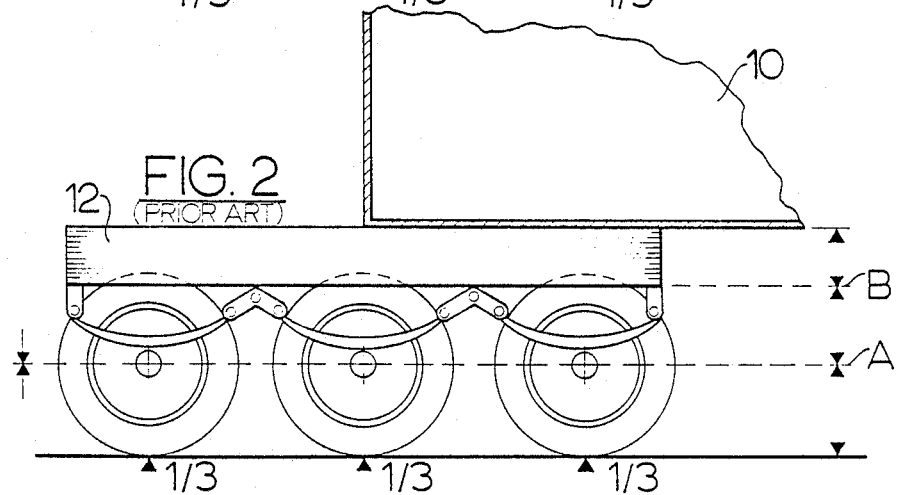
FIG. 2 is a view like FIG. 1 showing the axles all bottomed out.
Figure 3:
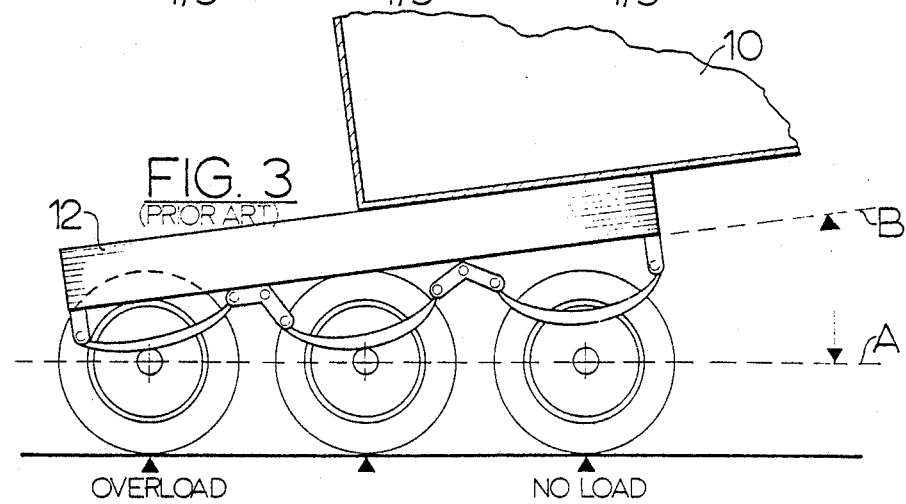
FIG. 3 is a view like FIGS. 1 and 2 showing the maximum divergence of the vehicle from parallel with the wheel axles.

Referring to the drawings, and particularly to FIGS. 1, 2 and 3, there is illustrated a vehicle 10 with a suspension frame 12 rigidly mounted on the vehicle and carrying a tri-axle suspension consisting of leading axle 14, centre axle 16 and trailing axle 18. The axles are mounted on respective springs 20 that are connected by equalizers 22. The axles are shown in FIG. 1 in a partially loaded state. The plane A containing all three axles is parallel to the reference plane B of the suspension frame 12. The maximum deflection of the axles is illustrated at $D_{max}$. In this condition, the three axles are equally loaded, as indicated by the "⅓" reference beneath each wheel.

FIG. 2 illustrates the same suspension with all three axles bottomed out, that is at the maximum deflection so that the allowable deflection is zero. The planes A and B are still parallel and the loads of the three axles are still equal.

In FIG. 3, the vehicle 10 and the support frame have adopted an orientation that is not parallel to the highway on which the vehicle is riding. The wheels do remain in contact with the highway however so that the equalizer associated with the trailing axle 18 and the centre axle 16 has reached its travel limit and the suspension for the axle 18 has bottomed out. At the same time, the suspension for the leading axle has been so relaxed that the axle 14 is unloaded. The centre axle 16 carries a partial load. The condition illustrated in FIG. 3 shows the maximum divergence from parallel between the planes A and B.

Figure 4:
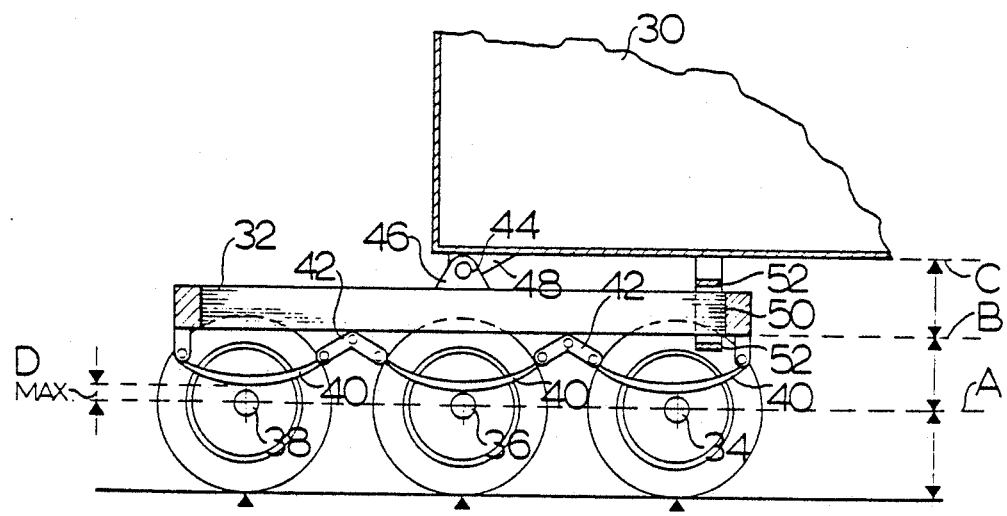
FIG. 4 is a schematic elevation of a pivoted suspension according to the present invention.

FIG. 4 illustrates a vehicle 30 with an equalizing suspension according to the present invention. The suspension frame 32 carries a tri-axle consisting of leading axle 34, centre axle 36, and trailing axle 38. The axles are connected to springs 40 which are interlinked by equalizers 42. In this suspension the suspension frame 32 is not rigidly connected to the vehicle 30 but is connected to it by a horizontal pivot shaft 44 generally parallel to the axles and mounted on the suspension frame and the vehicle by respective trunnions 46 and 48. The vehicle 30 also carries an oscillation limiter frame 50 near the front end of the suspension frame 32. The limiter frame includes a pair of flanges 52 that engage opposite sides of the suspension frame to limit its pivotal movement with respect to the vehicle. The plane A containing the three axles is parallel to the reference plane B of the suspension frame, which is in turn parallel to the reference plane C on the vehicle 30. The maximum deflection available for the axles is illustrated by $D_{max}$.

Figure 5:
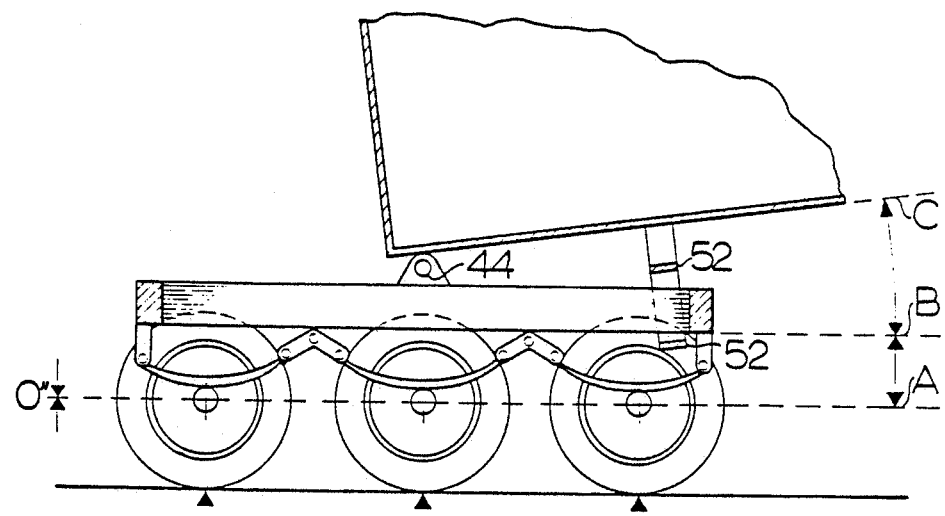
FIG. 5 is a view like FIG. 4 showing all three axles bottomed out and the vehicle at its maximum divergence from parallel.

FIG. 5 illustrates the suspension of FIG. 4 in the condition of maximum divergence from parallel between the vehicle plane of reference C and the plane A of the axles. In this case, the suspension frame 32 has its reference plane B parallel to the reference plane A of the axles, so that the axle suspensions remain equally loaded, despite the deflection of the vehicle out of parallel with the highway. As shown in FIG. 5, the bottom flange 52 of the oscillation limiter has engaged the suspension frame 32 to limit the pivotal movement of the vehicle 30 around the pivot shaft 44.

Figure 6:
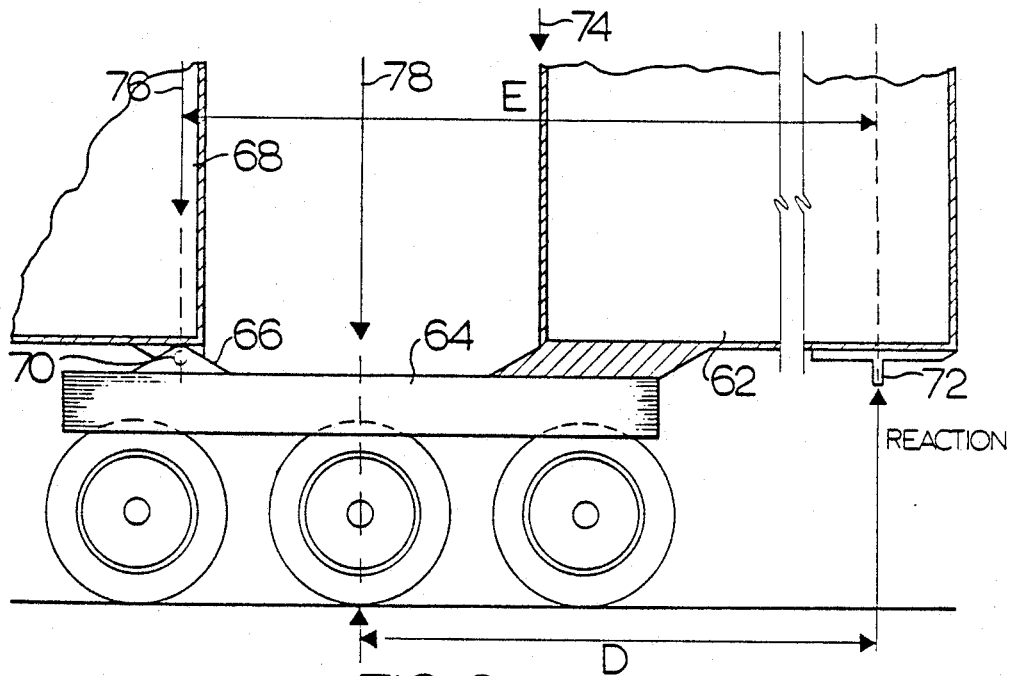
FIG. 6 is a schematic elevation of a prior art "B" train configuration.

FIG. 6 illustrates a rigid suspension like that of FIGS. 1, 2 and 3 applied to the suspension of a "B" train. In such a configuration, the forward vehicle 62 carries a suspension frame 64 projecting to its rear and carrying the multiple axle suspension. Towards the rear end of the suspension frame 64 is a fifth wheel attachment 66 to which a following vehicle 68 is attached. This rearwardly extending suspension frame is subjected to significant bending stresses.

Because of weight distribution considerations, and space limitations, the king pin load bearing point 70 of the following vehicle is located behind the centre of reaction of the common suspension. This generates a moment downwards on the common suspension and equally upwards on the lead king pin 72 in the proportion of the respective moment arms D and E. This moment significantly increases the bending stresses and the suspension loadings. The net induced suspension loading is equal to the king pin loading times the ratio of moment arm E to moment arm D. This means that the total suspension load equals the forward load, indicated at 74, the king pin load, indicated at 76 and the induced load ($76 \times E/D$) indicated at 78.

Figure 7:
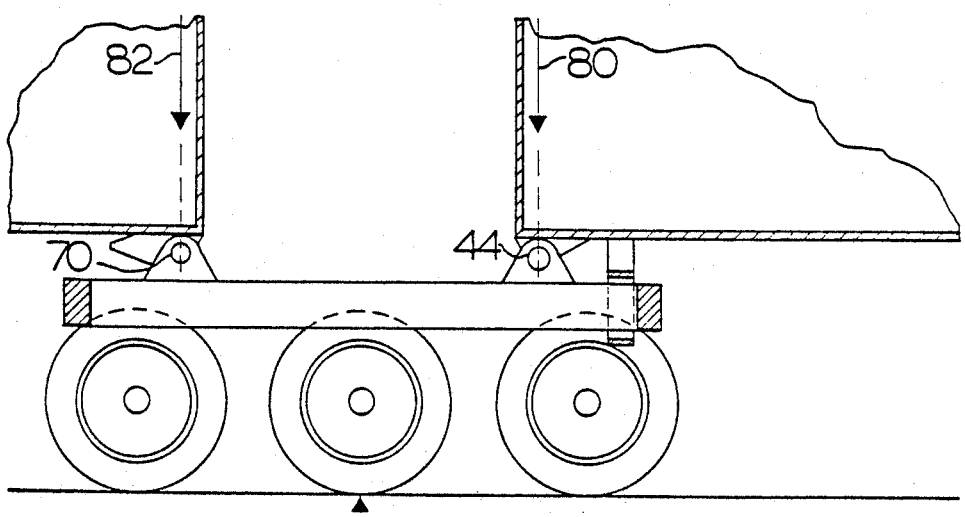
FIG. 7 is a schematic elevation of a "B" train suspension incorporating the present invention.

A suspension according to the present invention as applied to a "B" train configuration is illustrated in FIG. 7. The loading on the suspension is the sum of the loading 80 from the forward vehicle, which acts through the pivot shaft 44, and the king pin loading 82 from the following vehicle that acts vertically through the king pin 70. There are no bending moments applied and no induced loadings.

Figure 8:
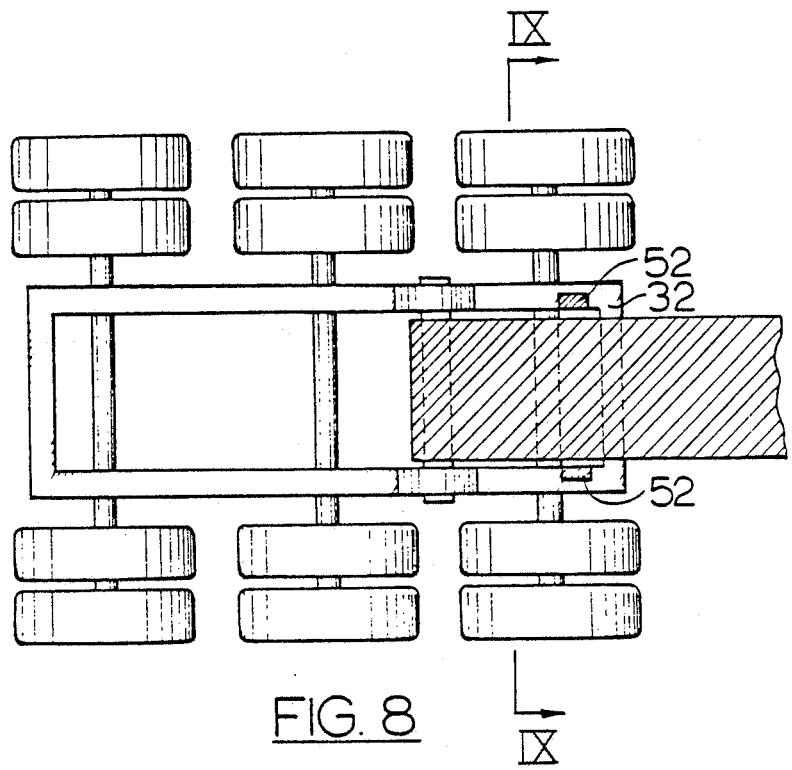
FIG. 8 is a schematic plan view, partially in section, showing the steering guide of an oscillation limiter.
Figure 9:
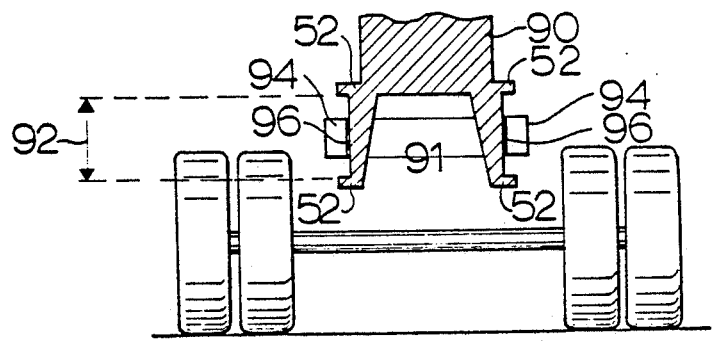
FIG. 9 is a sectional view along line IX—IX of FIG. 8.

FIGS. 8 and 9 illustrate the steering guide associated with the oscillation limiter 50. The limiter frame 90 has a generally inverted U-shape as shown in FIG. 9. The arms 91 of the U project into the suspension of frame 32 with flanges 52 projecting outwardly from each side, above and below the frame. The flanges act, as previously discussed, to engage the frame to limit the vertical oscillating movement of the vehicle with respect to the suspension frame 32. The oscillation limit is as shown at 92. The suspension frame 32 also carries steering guides 94 that engage the sides of the limiter frame arms. The contact between the guides and the suspension frame is provided by adjustable resilient components with friction faces. These components serve to damp the movements between the frames 90 and 32 and provide a predetermined amount of resiliency in the suspension mounting. In this exemplary embodiment, the resilient components are pieces of non-metallic, resilient material. In other embodiments, spring shock absorbers or the like may be employed. In turning, the limiter frame 90 acts through the steering guides on the frame 32 to exert a steering force on the suspension frame to limit the amount of torque applied to the frame through the pivot shaft 44.

In all of the illustrated embodiments of the invention, the bearings of the pivot shaft 44 are mounted in non-metallic resilient material. Both the bearing mountings and the steering guide surfaces are adjustable to provide any desired degree of damping.

While certain embodiments of the present invention have been described in the foregoing, it is to be understood that the invention is not to be considered limited to those embodiments only. The invention is to be construed as limited solely by the scope of the appended claims.

I claim:

1. A vehicle comprising a vehicle body, a rigid suspension frame, a plurality of parallel axles each carrying ground wheels for supporting the axle from a ground surface, an equalizing resilient suspension supporting said plurality of axles on said suspension frame, said suspension comprising a plurality of spring means each connecting a respective one of the axles to the suspension frame and being deflectable relative thereto by a load applied between the suspension frame and the axle and equalizer means for communicating said deflection of one of the spring means relative to the suspension frame to at least one other of the spring means so as to tend to equalize loads applied to the axles by the suspension frame, pivot mounting means mounting the suspension frame on the vehicle body for pivotal movement about a substantially horizontal axis parallel to said axles, pivot limiting means attached to said vehicle body and arranged to limit said pivotal movement between predetermined limits such that both said pivotal movement of the pivot mounting means and said equalizing resilient suspension co-operate to accommodate non-parallelism of the vehicle body with the ground surface, and steering guide means fixed to said vehicle body at a position thereon spaced from said pivot mounting means and arranged to engage said suspension frame to communicate thereto lateral steering force.

2. A vehicle according to claim 1 wherein the suspension frame projects to the rear of the vehicle body.

3. A vehicle according to claim 1 wherein the said pivot mounting means comprises a shaft parallel to the wheel carrying axles and trunnions mounting the shaft on the suspension frame and the vehicle body.

4. A vehicle according to claim 3 wherein the trunnions include resilient friction bearings.

5. A vehicle according to claim 1 wherein said steering guide means comprises a pair of friction faces arranged to engage said suspension frame to provide, in addition to said lateral steering forces, damping forces on said pivotal movement.

6. A vehicle according to claim 1 in which the axis of the pivot mounting means is located substantially centrally of said axles.

7. A vehicle according to claim 1 wherein the axis of the pivot mounting means is located between the center of said axles and a leading one of said axles.

8. A vehicle according to claim 1 wherein the suspension frame carries a fifth wheel between said axis of the pivot mounting means and a trailing one of said axles.

9. A vehicle according to claim 1 wherein the pivot limiting means comprises a limiter frame secured to the vehicle body including an upper flange and a lower flange arranged above and below respectively the suspension frame and arranged to engage the suspension frame at a position thereon spaced from the pivot mounting means.

10. A vehicle according to claim 9 wherein the limiter frame includes said steering guide means located on opposite lateral sides of the limited frame for engagement with the respective sides of the suspension frame during turning of the vehicle.

11. A vehicle according to claim 10 wherein the steering guide means comprise a pair of friction faces arranged to engage said suspension frame to provide, in addition to said lateral steering forces, damping forces on said pivotal movement.

12. A vehicle according to claim 11 wherein said suspension frame comprises a pair of parallel beams and wherein said limiter frame projects between said beams and engage said beams on respective side of said limiter frame.

* * * * *